US008375594B1

(12) United States Patent
Guenther (10) Patent No.: US 8,375,594 B1
(45) Date of Patent: Feb. 19, 2013

(54) PNEUMATIC COUNTERBALANCE FOR OPTICAL HEAD GANTRY

(75) Inventor: Bryan W. Guenther, Tucson, AZ (US)

(73) Assignee: Bruker Nano Inc., Santa Barbara, CA (US)

( * ) Notice: Subject to any disclaimer, the term of this patent is extended or adjusted under 35 U.S.C. 154(b) by 433 days.

(21) Appl. No.: 12/797,436

(22) Filed: Jun. 9, 2010

(51) Int. Cl.
*G01B 5/004* (2006.01)
(52) U.S. Cl. ............................. 33/503; 33/551
(58) Field of Classification Search .......... 33/503, 33/546, 551
See application file for complete search history.

(56) References Cited

U.S. PATENT DOCUMENTS

| | | | | |
|---|---|---|---|---|
| 3,749,501 | A * | 7/1973 | Wieg | 33/503 |
| 6,826,840 | B1 * | 12/2004 | Lindsey et al. | 33/503 |
| 7,165,331 | B1 * | 1/2007 | Lindsey et al. | 33/503 |
| 2010/0250178 | A1 * | 9/2010 | Noda et al. | 33/502 |
| 2011/0119025 | A1 * | 5/2011 | Fetter et al. | 33/503 |
| 2012/0079731 | A1 * | 4/2012 | Ruck | 33/503 |

* cited by examiner

*Primary Examiner* — G. Bradley Bennett
(74) *Attorney, Agent, or Firm* — Antonio R. Durando (57) ABSTRACT

A pair of pneumatic cylinders is used to counterbalance the weight of a large gantry supporting the optical head of an interferometric profiler. The gantry is supported by the cylinders within pairs of linear-bearing rail that provide a large vertical travel. The pressure in the cylinders is adjusted so as to provide an upward force sufficient to oppose the weight of the gantry and prevent its descent, but not so great as to cause it to rise. In essence, the counterbalance pressure is adjusted to equilibrate the weight of the gantry in such a way that a small force applied manually upward or downward will cause the gantry to move easily in either direction, thereby making it possible for an operator to position the optical head rapidly and with minimum effort as required for the initial alignment with a test object.

23 Claims, 8 Drawing Sheets

PNEUMATIC COUNTERBALANCE FOR OPTICAL HEAD GANTRY

BACKGROUND OF THE INVENTION

1. Field of the Invention

This invention pertains to the general field of optical metrology. In particular, it pertains to a pneumatically counterbalanced gantry suitable for manual positioning of an interferometric objective in precise alignment with a large sample object.

2. Description of the Prior Art

Mounting an interferometric optical head on a gantry-type structure makes it possible to measure large parts with oddly placed surfaces or recesses, such as engine parts. However, the process of alignment of the optical head with the test surface requires a versatility of movement that is not available in conventional instrumentation. Interferometric objectives have to be roughly perpendicular to the surface of interest in order to perform a measurement and the small angular range of adjustment of conventional stages is critical for fine tuning but is not capable of providing the large range of motion required for aligning large samples.

In order to accommodate such large parts, the optical head is usually mounted on a gantry equipped with a large-angle tilting mechanism that allows rotation of the entire objective assembly through approximately 90 degrees (+/−45 from vertical) of motion. Such a gantry arrangement makes it possible to measure irregularly shaped samples without the use of costly and cumbersome part fixtures dedicated to specific parts. The tilting mechanism may be implemented simply with two bearing spindles mounted coaxially on opposite sides of the optical head assembly for rotation within the gantry. The center of rotation is advantageously located at a convenient position with respect to the stage.

The gantry is preferably movable vertically along two supporting rail structures, one on each side of the gantry, in order to provide vertical adjustment of the optical head position with respect to the test object. Thus, in preparation for a measurement, the gantry is lifted to provide a safe clearance for the measurement objective while the large test object is placed in its measurement stage, then the gantry is lowered and the optical head is tilted to the degree necessary to provide the desired alignment for the measurement.

This arrangement works well in theory, but in practice it presents several operating problems that render it impractical for either manual or automated operation. The large range of vertical motion desired for the gantry, so that it can accommodate parts of very different heights, makes motor-driven adjustments impractical because they are relatively slow and costly, and they would require a sophisticated crash-control mechanisms. Manual adjustment is therefore preferred, but the considerable weight of the gantry requires that a substantial upward force be applied to lift it, as well as a substantial support force be applied while lowering it in order to control its descent to the degree necessary to avoid crashing the head into the part. Therefore, manual operation of this type of gantry is impractical as well. This invention describes a pneumatic counterbalance mechanism that makes it possible to manually adjust the position of the optical head rapidly and with precision.

BRIEF SUMMARY OF THE INVENTION

The main aspect of the invention lies in a pair of pneumatic cylinders used to counterbalance the weight of the large gantry containing the optical head and the alignment mechanism of an interferometric profilometer. The gantry is supported by the cylinders within pairs of bearing rails that provide a large vertical travel for positioning the interferometric objective with respect to test objects of varied sizes. The common pressure in the cylinders is adjusted so as to provide an upward force sufficient to oppose the weight of the gantry and prevent its gravitational descent, but not so great as to cause it to rise. In essence, the counterbalance pressure is adjusted to equilibrate the weight of the gantry in such a way that a small force applied manually upward or downward will cause the gantry to move easily in either direction, thereby making it possible for an operator to move the optical head rapidly and with minimum effort as required for positioning it within measuring distance of a test object.

In order to ensure that an acceptable counterbalance is present at all height positions within the vertical range of motion of the gantry, the pressure in the cylinders must remain substantially constant throughout the travel. This may be achieved by connecting the pneumatic cylinders to a sufficiently large air reservoir such that the overall pressure is not materially affected by the contraction and expansion of the cylinders (because of the relatively small air volume subtracted or added to the chamber). As a result, once set, the counterbalance pressure remains substantially constant in the cylinders. Alternatively, the pressure could be controlled with an inline regulator that either adds or removes air from the cylinders as the gantry rises or descends, respectively, so as to maintain the same pressure at all times.

In the event of a loss of air pressure, the weight of the gantry could pose a danger to the operator. Therefore, according to another aspect of the invention, a safety mechanism is provided to stop the vertical travel in the event of a pressure loss in the cylinders. The mechanism consists of a spring-loaded plunger aligned with a column of vertical holes in the gantry support structure. The plunger is held retracted by a pneumatic cylinder connected to the same air source that supplies the air to the counterbalance cylinders. A cam device causes the plunger to engage one of the holes if the pneumatic cylinder is retracted as a result of loss of air pressure, thereby preventing a sudden descent as the pressure decreases.

According to another aspect of the invention, a crash-prevention detector may be provided to sense a potential collision between the objective and the test object during the automated alignment of the optical head and the final measurement process. Such a device preferably consists of a ring (or other shape) that is suspended below or next to the objective. When a part contacts the ring, it causes a sideways or vertical displacement, which in turn triggers an electrical switch that shuts down the equipment and/or triggers an alarm. Such a device can be provided in a separate, removable, housing or as an integral part of the objective.

Various other aspects and advantages of the invention will become clear from the description that follows and from the novel features particularly recited in the appended claims. Therefore, to the accomplishment of the objectives described above, this invention consists of the features hereinafter illustrated in the drawings, fully described in the detailed description of the preferred embodiments, and particularly pointed out in the claims. However, such drawings and description disclose only some of the various ways in which the invention may be practiced.

DETAILED DESCRIPTION OF THE INVENTION

This invention lies in the combination of a conventional gantry used to support and position an instrument in close proximity of a test object with a pneumatic system adapted to counterbalance the weight of the movable portion of the gantry over a wide range of vertical motion. The well balanced equilibrium provided by the combination allows the manual vertical displacement of the instrument with substantially no effort, which in turn makes it possible to rapidly and securely translate the instrument with full control of its movement.

As used herein, the term "gantry" is used to refer generally to a framework raised on side supports to bridge over or around something. In particular with relevance to this disclosure, the gantry is the pivoting assembly that supports the optical head of the invention over the test object, such assembly being mounted on two rail structures that provide support as well as vertical travel to the gantry. The terms "optical head," "interferometric objective" and simply "objective" are used interchangeably to refer, without limitation, to the instrument mounted on the gantry to perform optical profilometry or other testing of the test object.

Figure 1:
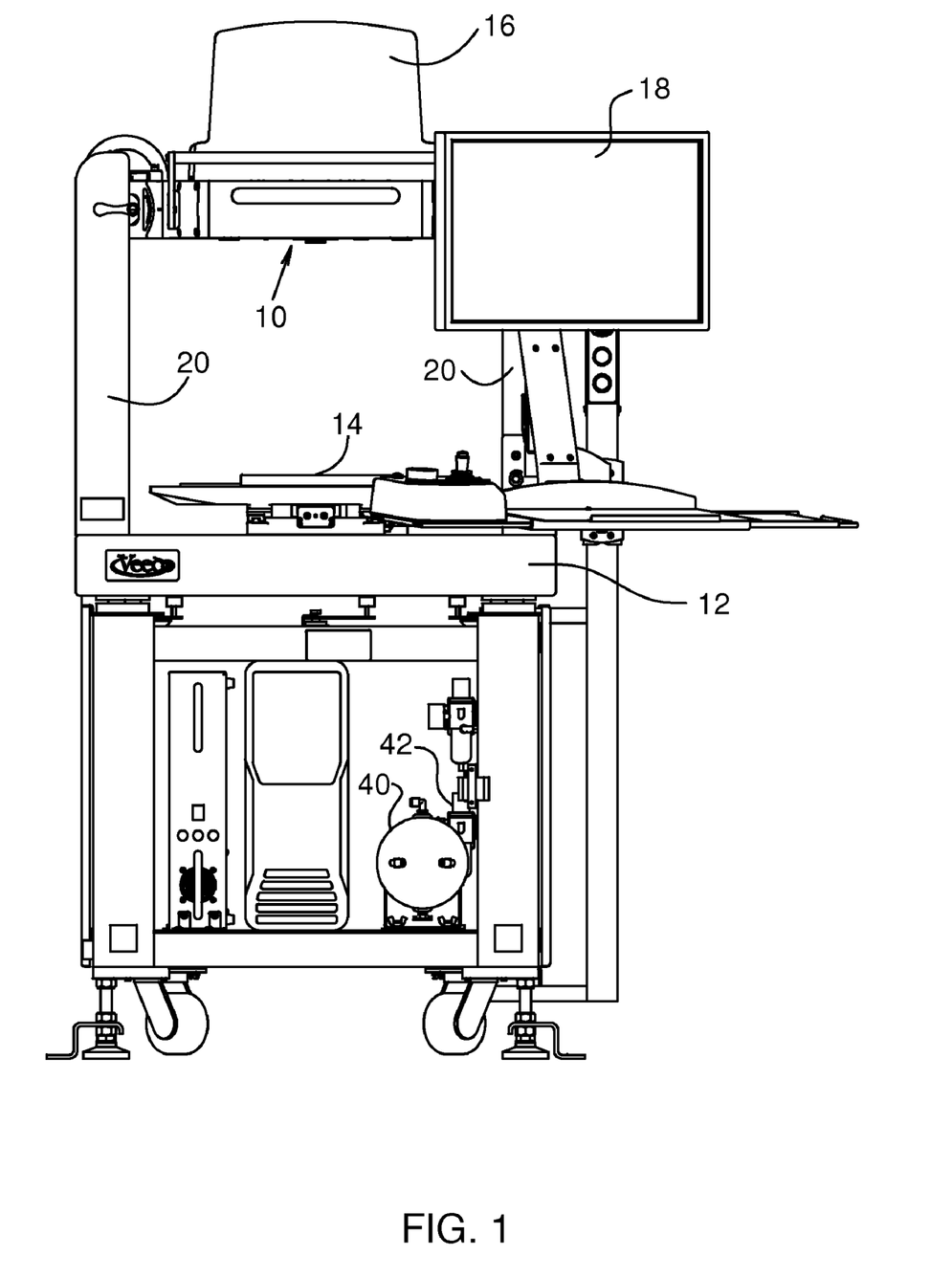
FIG. 1 illustrates in elevational view a gantry according to the invention mounted on a conventional air isolation table for vibration control.

Referring to the figures, wherein like parts are referenced with the same numerals and symbols, FIG. 1 is an elevational front view of a gantry 10 according to the invention. The gantry is installed on a conventional air isolation table 12 where a sample stage 14 is placed for receiving and measuring a large object, such as an engine block. The figure also illustrates a computer 16 for processing signals and a monitor 18 through which an operator can view the output of the instrument. As seen more clearly in the partial view of FIG. 2 (where the computer 16 has been removed), the gantry 10 is supported by two lateral structures 20 within which the gantry is mounted for vertical translation. A linear bearing with a pair of vertical rails 22 is provided in each structure 20 and is coupled to corresponding rollers 24 in opposite shoulders 26 of the gantry for smooth vertical movement.

Figure 2:
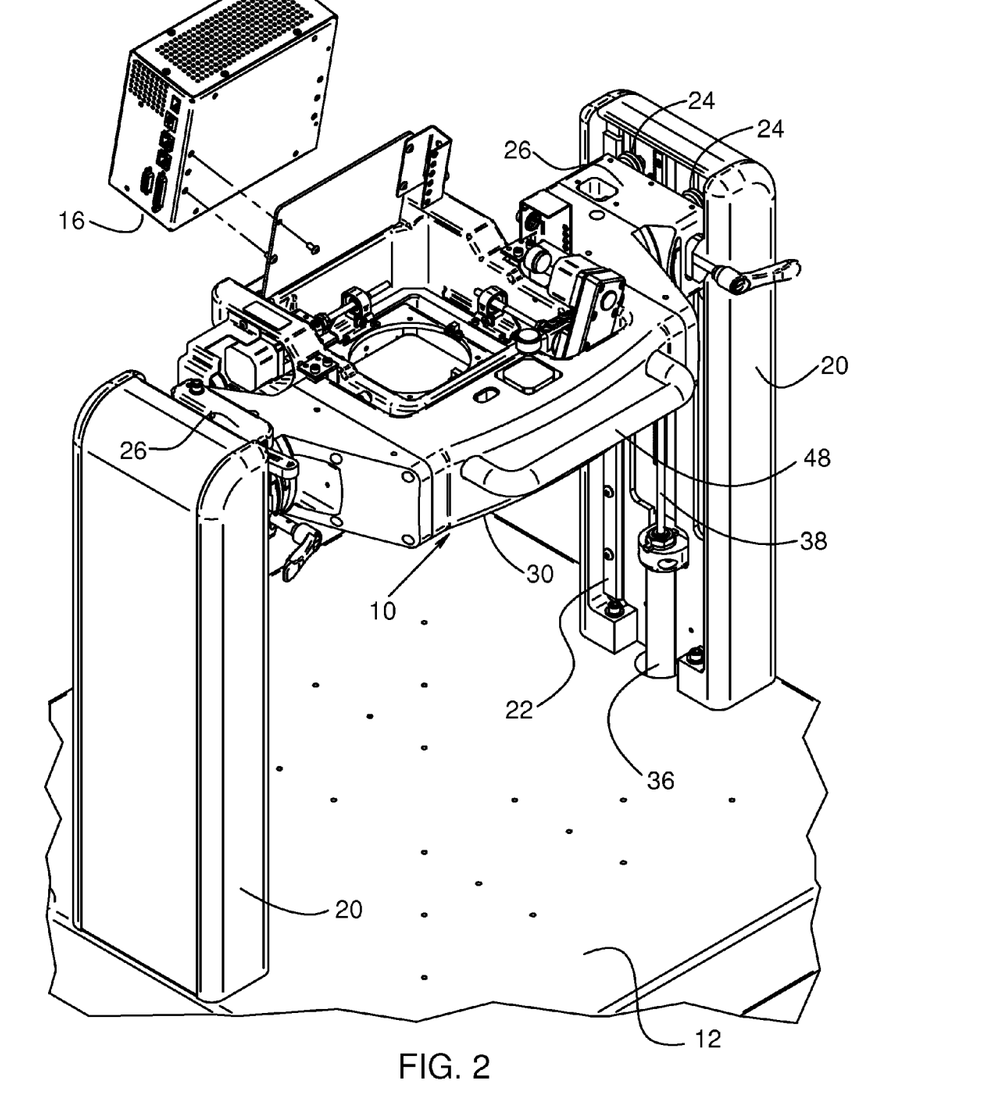
FIG. 2 shows a perspective view of the gantry of FIG. 1 and the pair of pneumatic cylinders used to counterbalance its weight.
Figure 3:
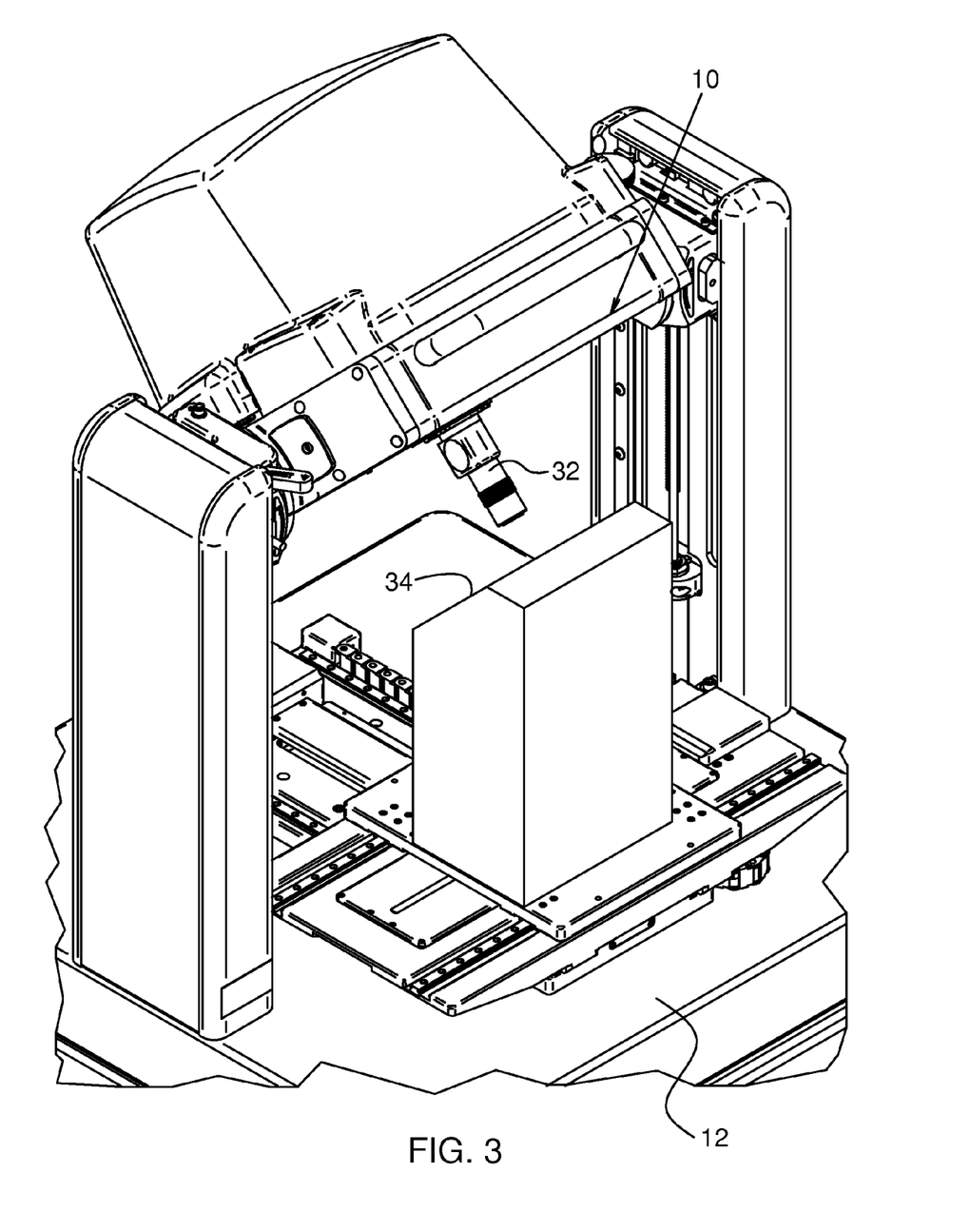
FIG. 3 illustrates the gantry of FIG. 1 with an interferometric objective rotated for alignment with the test surface of a part under measurement.

The interferometric objective of the instrument (not shown in FIGS. 1 and 2) is mounted in a receiving opening 28 of a support block 30 of the gantry 10 so as to project downward toward the test object (also not shown). With the objective in place, the gantry 10 is lowered toward the part to be tested and aligned for measurement. To that end, the gantry is also preferably pivotable around a horizontal axis over a wide angular range of motion so as to enable a perpendicular orientation of the objective with respect to the test surface of interest. The block 30 of the gantry that contains the objective is connected on opposite sides to the two shoulders 26 by means of two coaxial spindles (not shown) that allow the rotation of the objective around the spindles' axes. The range of rotation is preferably at least 90 degrees, 45 degrees on each side of vertical, in order to allow perpendicular alignment of the objective with a surface oriented at 45 degrees from horizontal. This permits measurement of a surface oriented at any greater angle simply by flipping the test part upside down. FIG. 3 illustrates an objective 32 placed in alignment with a typical sample surface 34 of a part under measurement.

Figure 4:
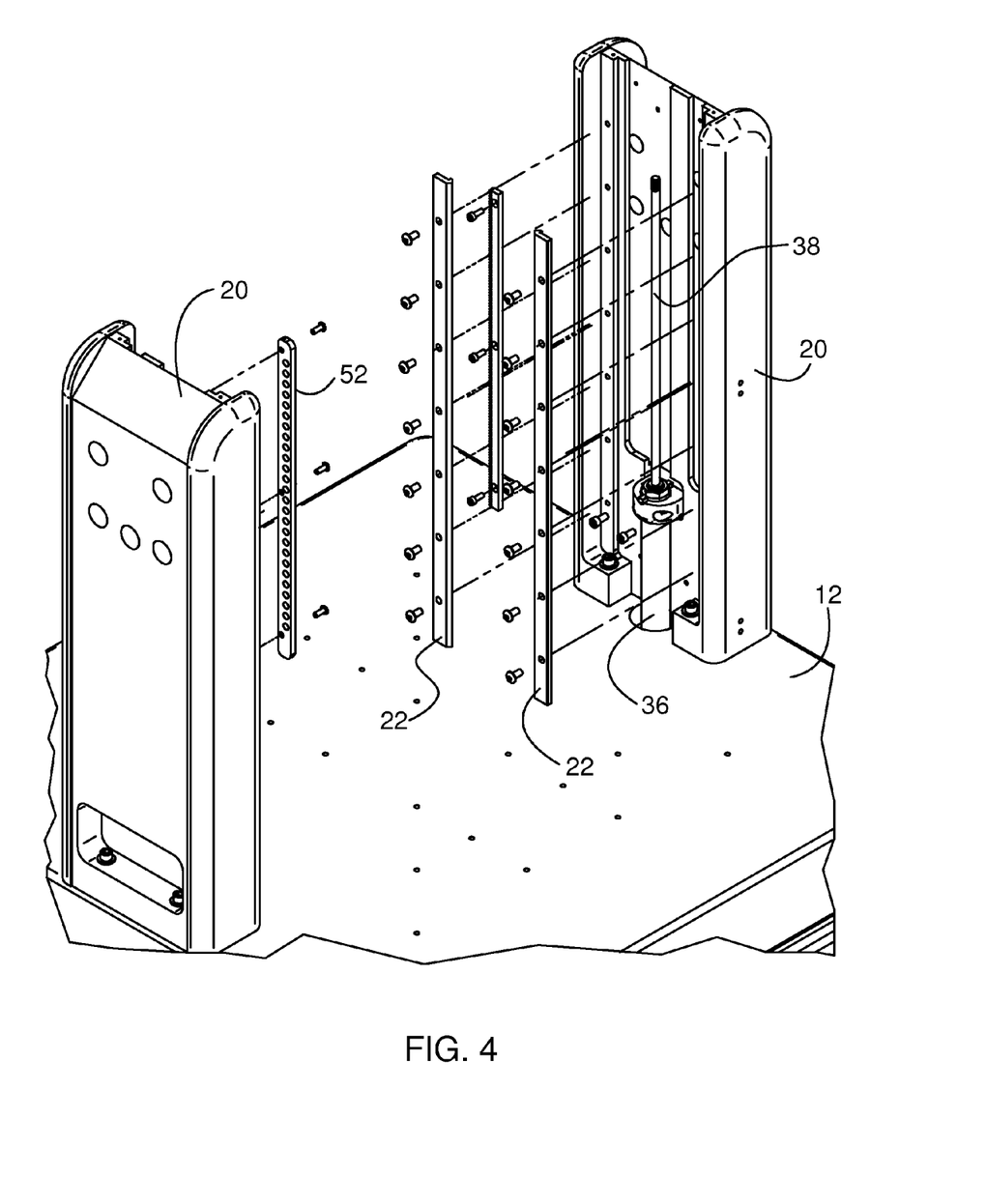
FIG. 4 is an exploded partial view of the lateral structures that support the translatable and pivotable gantry of the invention.

Referring back to FIG. 2 and also the exploded partial view of FIG. 4, the critical components of each support structure 20 (to which the shoulders 26 of the gantry are coupled) are illustrated. In particular, a pneumatic cylinder 36 is mounted in vertical alignment with the rails 22 in each structure 20 and the cylinder shaft 38 is rigidly coupled to a corresponding gantry shoulder 26 to support the gantry. Thus, so long as the air pressure in the cylinders 36 counterbalances the weight of the gantry 10, the gantry remains stationary without regard to the degree of extension of the shafts 38. According to the invention, the pressure in the cylinders is regulated so as to provide sufficient up-ward force to maintain the vertical position of the gantry without any other support from external forces. That is, the pressure in the cylinders is set counterbalance the downward force produced by the weight of the gantry with all the equipment attached to it. It is also clear that the same pressure should be applied to both cylinders in order to avoid torques that could cause the gantry to bind in their rolling connection to the vertical rails 22.

Inasmuch as the goal of the invention is to provide a system wherein the vertical position of the gantry is stable simply as a result of the upward force provided by the air cylinders 36, it is apparent that such force needs to be at least as large as the downward force provided by the gantry (due to its weight), but not larger than the combination of the gantry's weight and the friction forces produced by the motion of the gantry along the linear bearings that support it and guide it. Otherwise, the air cylinders would lift the gantry. In addition, the force exerted by the cylinders needs to remain within these parameters at all vertical positions of the gantry along its vertical travel. That is, regardless of the degree of extension of the air cylinders, their pressure must remain substantially constant. More precisely, the total pressure variation in the cylinders between full extension and full contraction must be such that the counterbalancing forces are always at least as large as the weight of the gantry but not greater than the weight plus the friction forces involved in the vertical translation of the gantry.

Figure 5:
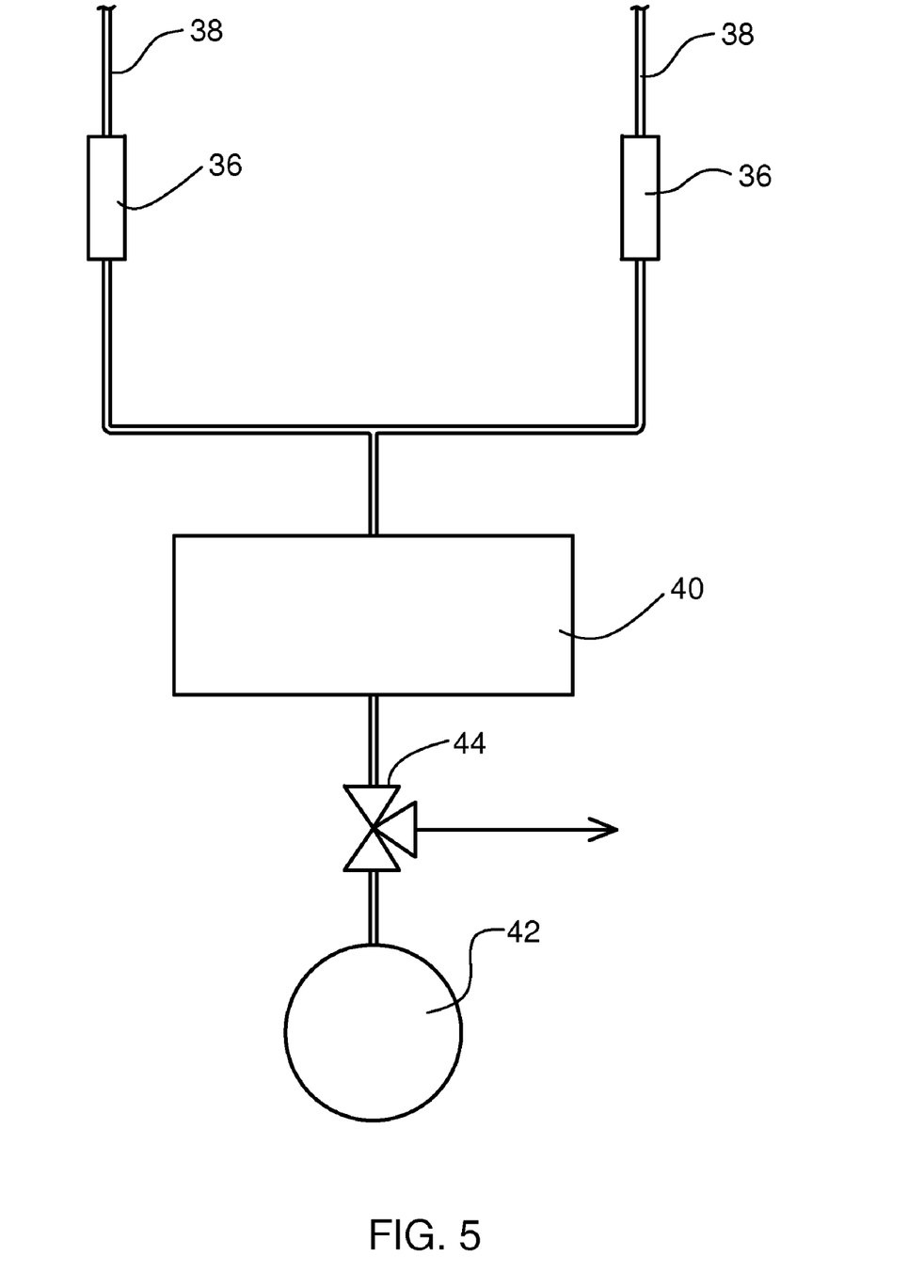
FIG. 5 is a schematic diagram of the pneumatic system connected to the gantry of the invention.

As illustrated schematically in FIG. 5, such pneumatic performance is easily achieved by introducing in a self-contained, closed pneumatic system, a reservoir chamber 40 connected to the cylinders 36. If the air chamber has a sufficiently large volume to absorb the gain or loss of air resulting from the contraction or expansion, respectively, of the air cylinders 36 without experiencing a significant change in overall system pressure, the force exerted by the cylinders will remain substantially the same and the gantry will be stable at all elevations. Under such conditions, an operator will be able to lift or lower the gantry simply by applying the minimal force required to overcome whatever residual friction force is keeping the gantry in place at any given time.

When the gantry of the invention is used with an instrument placed on an air isolation table, such as illustrated in FIG. 1, the same air source can be used advantageously to provide air both to the table and to the pneumatic system of the invention through respective pressure regulators. A conventional air source 42 (such as a compressor or a facility line) and a pressure regulator 44 are used to initially establish the pressure within the parameters outlined above. As the weight of the gantry changes because of different objectives or peripheral devices attached to it, a new pressure may be established simply by regulating the amount of air received from the source 42. For example, in a system as depicted in the figures with an air chamber 40 of 462 cubic inches in volume and cylinders 36 of 1.06 inches in diameter, an operating pressure of 55 psig was found to be suitable to practice the invention.

Figure 6:
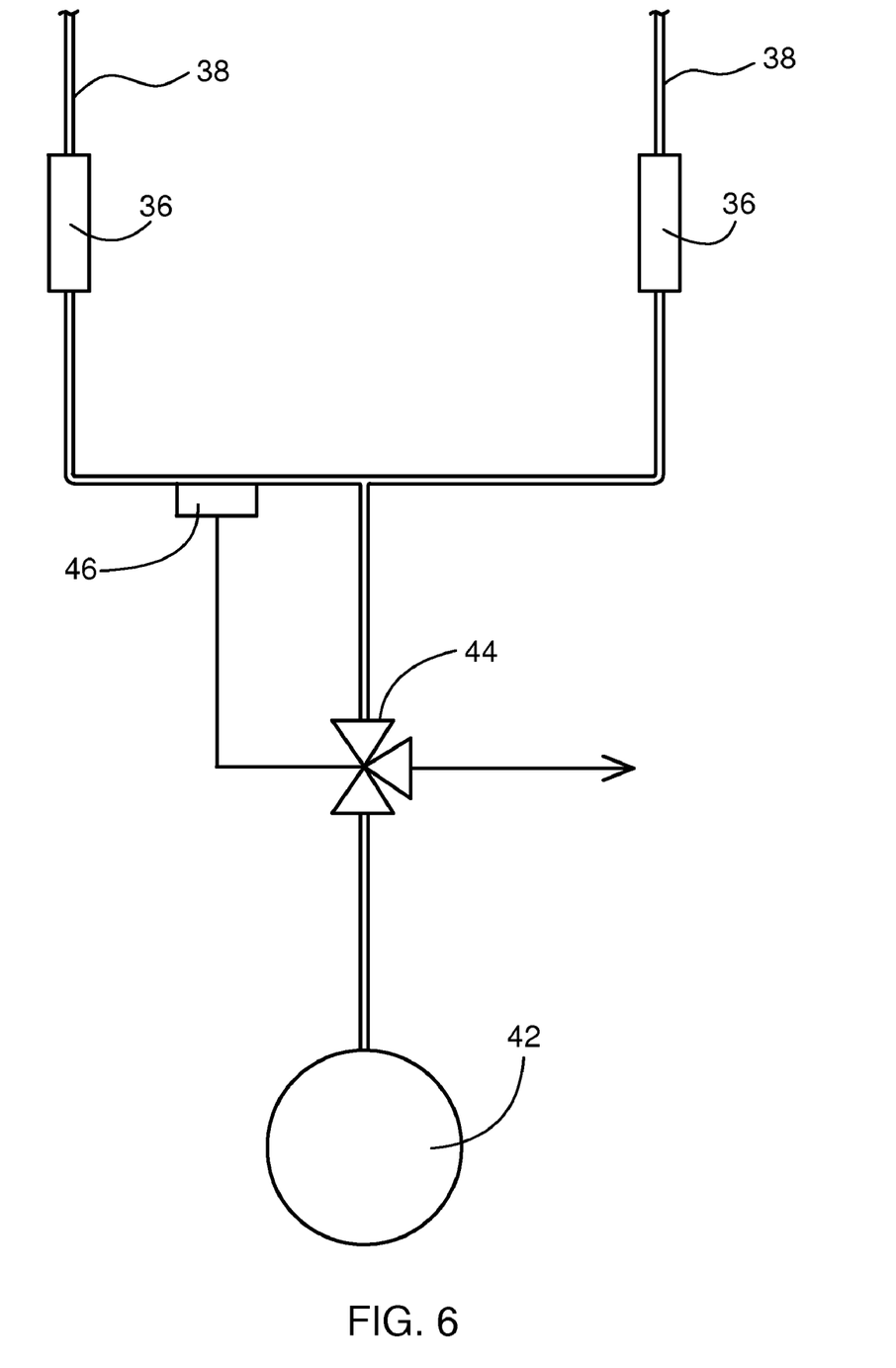
FIG. 6 is the diagram of an alternative embodiment of a pneumatic system connected to an optical profilometry gantry according the invention.

Alternatively, a pneumatic system suitable for the invention could be provided without the chamber 40 but with a pressure regulator 44 connected to and driven by a pressure sensor 46, as shown in FIG. 6. As the pressure in the cylinders 36 changes as a result of the vertical motion of the gantry 10, the sensor 46 would produce a signal to actuate the pressure regulator 44 to either add air to the system or release air from it as necessary to maintain the initial pressure. However, this configuration is not preferred because more complicated, more expensive and less reliable.

Thus, a pneumatic mechanism has been described that enables the rapid, reliable and easily controllable manual translation of the objective mounted on a gantry for alignment with test parts of various sizes and shapes. Simply by exerting a force sufficient to overcome the unbalanced friction forces of the system, an operator is able to move the gantry and all equipment attached to it up or down at will. A handle 48 is preferably provided, as seen in FIG. 2, to facilitate such vertical translation as well as the angular rotation of the objective around its pivoting axis.

Figure 7:
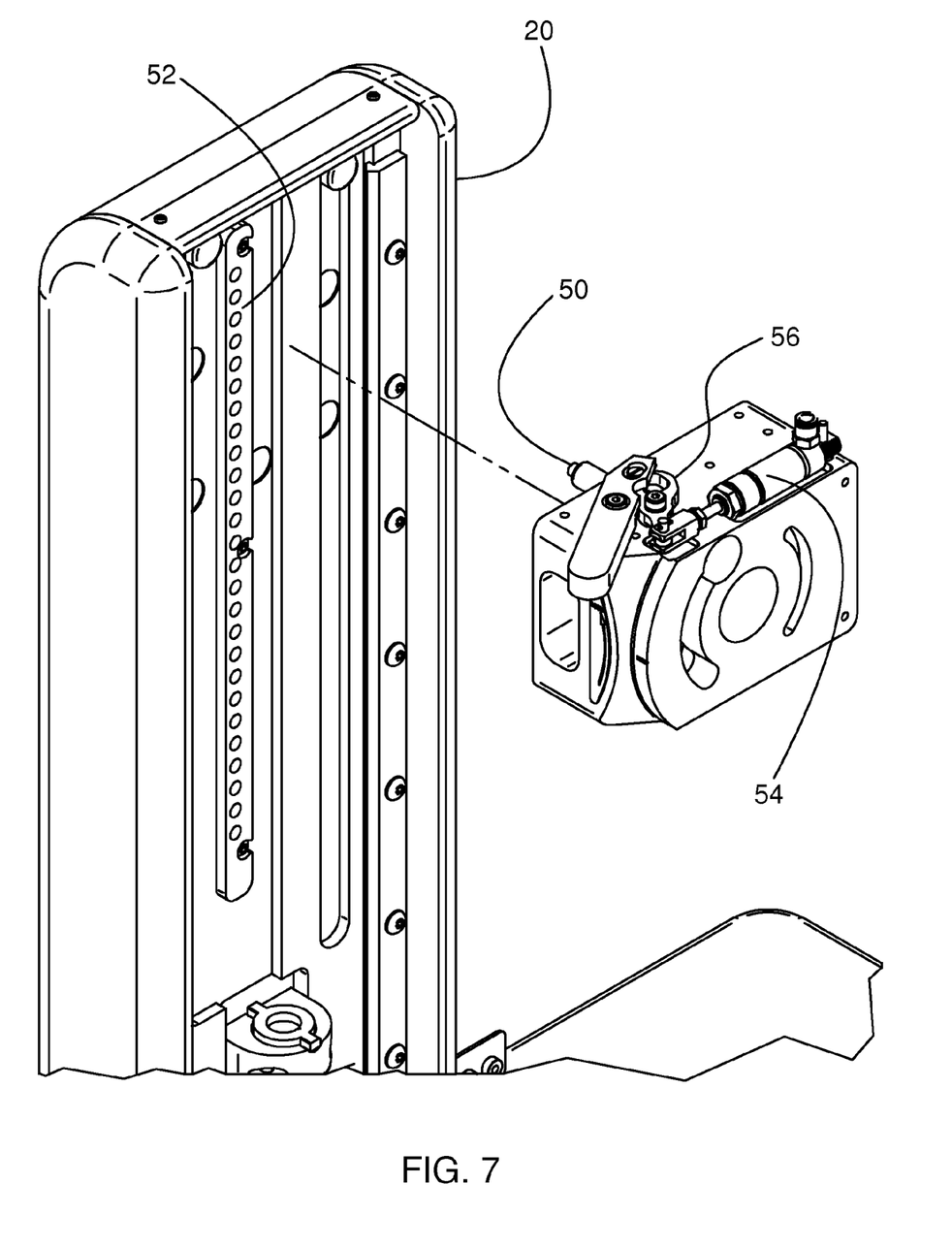
FIG. 7 is a view of a safety mechanism designed to stop the fall of the gantry of the invention in case of failure of the pneumatic system.

It is worth noting that in its operational mode the weight of the gantry of the invention is fully supported only by the cylinders 36 of the pneumatic counterbalance mechanism. The gantry and the equipment attached to it may weigh as much as 60 pounds and therefore they would fall rapidly if the pneumatic system failed. Thus, as a safety precaution, a safety mechanism is preferably provided to stop the sudden fall of the gantry in the event of a pressure loss in the pneumatic system, which would certainly damage the equipment and could also pose a danger to the operator. As illustrated in FIG. 7, the preferred embodiment of such a mechanism consists of a spring-loaded plunger 50 mounted in the gantry and aligned with a strip 52 coupled to each support structure 20 and containing a column of vertical holes (see also FIG. 4). The plunger 50 is held in retracted position by an air cylinder 54 that is pneumatically connected to the same air source (40 or 42) that supplies air to the counterbalance system. If the air pressure to the system is lost, even a slight retraction of the cylinder 54 will cause a cam device 56 to push the plunger 50 to engage one of the holes in the support structures 20 on both sides of the gantry and safely stop the descent of the gantry.

Figure 8:
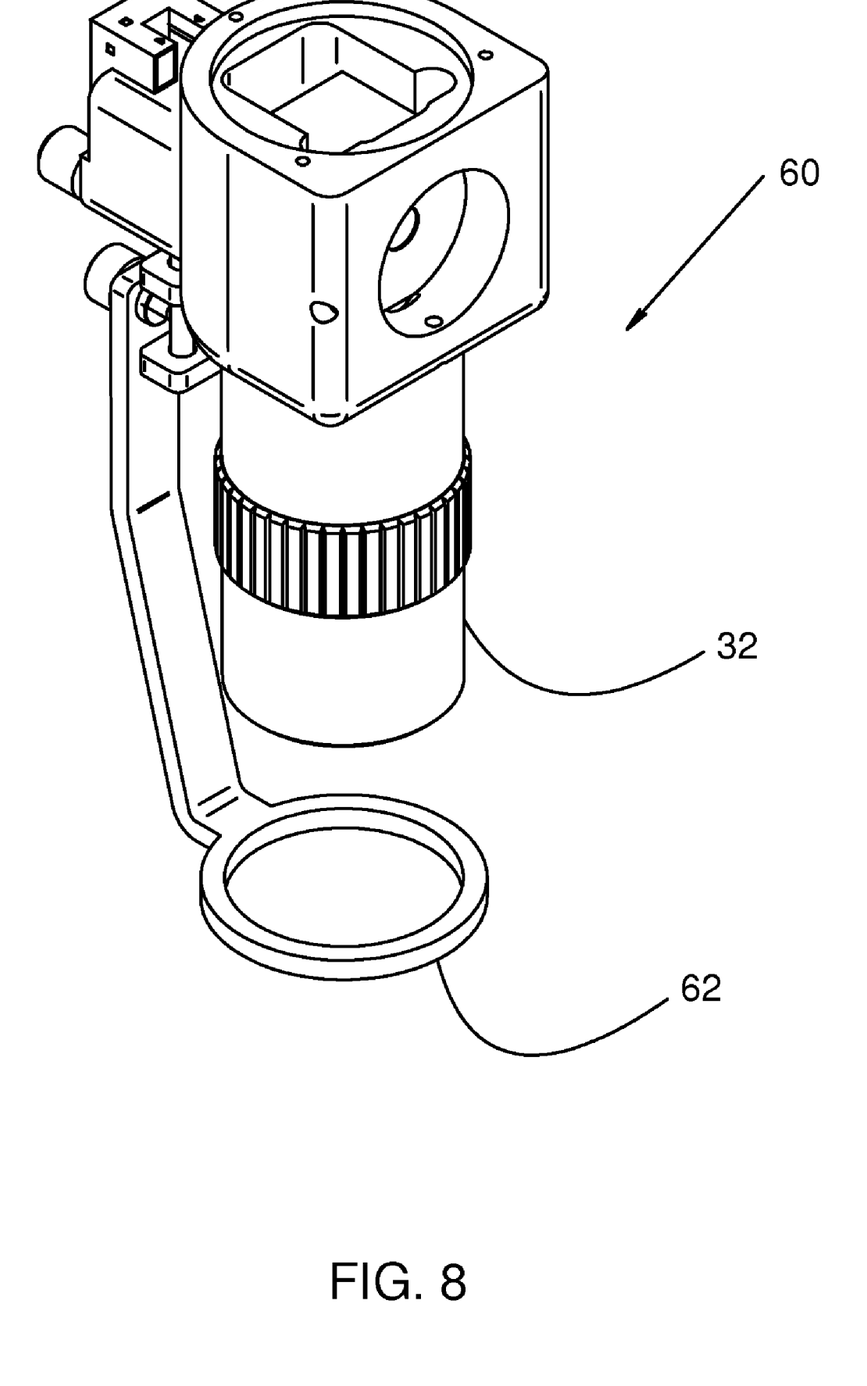
FIG. 8 is a perspective view of a crash-detection device preferably used to protect the interferometric objective mounted in the gantry of the invention.

As further protection against damage to the interferometric objective, a crash-prevention detector is also preferably provided to prevent a collision between the objective and the test object during the process of final alignment of the optical head or testing of the sample, both of which are carried out in automated fashion. As shown in FIG. 8, the preferred embodiment of such a device 60 consists of a ring 62 (or a similar plane structure) suspended below or next to the objective 64 mounted on the gantry. When a part contacts the ring 62 during a relative translation of the two, the ring is moved up or sideways, in either case causing the shaft 64 to which it is attached to trigger an electrical switch that shuts down the equipment and/or start an alarm. It is clear that the device could be incorporated into the objective 64.

Various changes in the details that have been described may be made by those skilled in the art within the principles and scope of the invention herein illustrated and defined in the appended claims. For example, the invention has been described in terms of an interferometric profiler, but it clear that the same concept and structural arrangement could be used as well in any type of device mounted on a gantry for vertical translation. Any number of cylinders could be used so long as positioned in such a manner as to provide well balanced counterforce to oppose the weight of the gantry and smooth translation with manual operation. Any gas could be used instead of air so long as safe and compressible within the parameters described to implement the invention. Also, the invention described a gantry that is translated only vertically with respect to the supporting structure, but it could be implemented equivalently with rails positioned at an angle with respect to horizontal, should that be convenient for some application. The same force analysis would apply with respect to the various force resultants operating along the direction of motion. Finally, the invention could be implemented in a system where a substantially constant force from a different source, such as a spring or a cylinder, pushes the gantry upward and the pneumatic system of the invention opposes the motion of the gantry by pushing it downward within the criteria of the invention. Thus, while the invention has been shown and described in what are believed to be the most practical and preferred embodiments, it is recognized that departures can be made therefrom within the scope of the invention, which is not to be limited to the details disclosed herein but is to be accorded the full scope of the claims so as to embrace any and all equivalent apparatus and methods.

What is claimed is:

1. A pneumatically counterbalanced gantry coupled to a support structure for translation relative to a test object, comprising:

a gantry including an instrument for performing surface measurements of a test object;

a structure mechanically coupled to the gantry so as to allow said translation of the gantry over a translation path, the translation being opposed by a friction force; and a pneumatic system coupled to the gantry so as to oppose a movement of the gantry along said translation path;

wherein the pneumatic system is pressurized during operation of the gantry with a pressure sufficient to overcome a force producing said movement of the gantry, but said pressure is not large enough to also overcome said friction force.

2. The gantry of claim 1, wherein said force producing the movement of the gantry is the gantry's weight and said movement is a descent of the gantry.

3. The gantry of claim 2, wherein said structure includes a linear bearing coupled to the gantry.

4. The gantry of claim 3, wherein said pneumatic system includes a cylinder aligned with the linear bearing along said translation path so as to oppose the descent of the gantry.

5. The gantry of claim 2, wherein said pneumatic system includes a cylinder aligned with said translation path so as to oppose a descent of the gantry.

6. The gantry of claim 2, wherein said pneumatic system includes a reservoir pneumatically coupled to the cylinder and a pressure regulator connected to the pneumatic system and to an air source.

7. The gantry of claim 2, wherein said pneumatic system includes a pressure regulator connected to the cylinder and to an air source.

8. The gantry of claim 2, wherein said structure includes two vertical linear bearings coupled to opposite sides of the gantry; and said pneumatic system includes an air cylinder aligned with each of said linear bearings along said translation path so as to oppose the descent of the gantry.

9. The gantry of claim 8, wherein said pneumatic system further includes a reservoir pneumatically coupled to the air cylinders and a pressure regulator connected to the pneumatic system and to an air source.

10. The gantry of claim 8, wherein said pneumatic system includes a pressure regulator connected to the cylinders and to an air source.

11. A pneumatically counterbalanced gantry for an optical profilometer, comprising:
- a gantry including an optical instrument;
- a support structure including linear bearings mechanically coupled to the gantry for vertical translation of the gantry over a translation path, the translation being opposed by a friction force;
- a pneumatic system including an air cylinder coupled to the gantry so as to oppose a descent of the gantry along said translation path;
- a reservoir pneumatically coupled to the cylinder; and
- a pressure regulator connected to the pneumatic system and to an air source,
- wherein the pneumatic system is pressurized at all times of operation of the gantry with a pressure sufficient to overcome a downward force produced by the weight of the gantry, but said pressure is not large enough to also overcome said friction force.

12. The gantry of claim 11, wherein said gantry includes a safety mechanism for interrupting said descent of the gantry in case of failure of the pneumatic system.

13. The gantry of claim 11, wherein said gantry includes a crash-detection device for protecting an objective of said optical instrument.

14. The gantry of claim 11, wherein said gantry is pivotable over a horizontal axis.

15. Method of supporting a gantry with a counterbalance force for translation relative to a test object, comprising the steps of:
- providing a structure mechanically coupled to the gantry so as to allow said translation of the gantry over a translation path, the translation being opposed by a friction force; and
- providing a pneumatic system coupled to the gantry so as to oppose a descent of the gantry along said translation path;
- wherein the pneumatic system is pressurized at all times of operation of the gantry with a pressure sufficient to overcome a downward force produced by the weight of the gantry, but said pressure is not large enough to also overcome said friction force.

16. The method of claim 15, wherein said structure includes a linear bearing coupled to the gantry.

17. The method of claim 16, wherein said pneumatic system includes a cylinder aligned with the linear bearing along said translation path so as to oppose the descent of the gantry.

18. The method of claim 15, wherein said pneumatic system includes a cylinder aligned with said translation path so as to oppose a descent of the gantry.

19. The method of claim 15, wherein said pneumatic system includes a reservoir pneumatically coupled to the cylinder and a pressure regulator connected to the pneumatic system and to an air source.

20. The method of claim 15, wherein said pneumatic system includes a pressure regulator connected to the cylinder and to an air source.

21. The method of claim 15, wherein said structure includes two vertical linear bearings coupled to opposite sides of the gantry; and said pneumatic system includes an air cylinder aligned with each of said linear bearings along said translation path so as to oppose the descent of the gantry.

22. The method of claim 21, wherein said pneumatic system further includes a reservoir pneumatically coupled to the air cylinders and a pressure regulator connected to the pneumatic system and to an air source.

23. The method of claim 21, wherein said pneumatic system includes a pressure regulator connected to the cylinders and to an air source.

* * * * *